(12) United States Patent
Häle (10) Patent No.: US 7,412,770 B2
(45) Date of Patent: Aug. 19, 2008

(54) DEVICE FOR ADJUSTING THE ANGLE OF A SIGHTING UNIT TO A TARGET

(75) Inventor: Anton Häle, Widnau (CH)

(73) Assignee: Leica Geosystems AG, Heerbrugg (CH)

( * ) Notice: Subject to any disclaimer, the term of this patent is extended or adjusted under 35 U.S.C. 154(b) by 31 days.

(21) Appl. No.: 10/554,459

(22) PCT Filed: Apr. 27, 2004

(86) PCT No.: PCT/EP2004/004432

§ 371 (c)(1),
(2), (4) Date: Nov. 18, 2005

(87) PCT Pub. No.: WO2004/097338

PCT Pub. Date: Nov. 11, 2004

(65) Prior Publication Data

US 2006/0117583 A1    Jun. 8, 2006

(30) Foreign Application Priority Data

Apr. 30, 2003  (CH) ..................................... 0756/03

(51) Int. Cl.
*G01C 15/00* (2006.01)
(52) U.S. Cl. .............................. 33/227; 33/321; 33/290
(58) Field of Classification Search .................. 33/227, 33/290, 321
See application file for complete search history.

(56) References Cited

U.S. PATENT DOCUMENTS

| | | | | |
|---|---|---|---|---|
| 1,984,874 A | * | 12/1934 | Gillmor et al. ................. | 33/328 |
| 2,093,503 A | * | 9/1937 | Wittkuhns et al. ............. | 33/321 |
| 2,133,241 A | * | 10/1938 | Baker .......................... | 356/3.11 |
| 3,200,498 A | * | 8/1965 | Argentieri .................... | 33/1 SP |
| 3,508,335 A | * | 4/1970 | Sundstrom .................... | 33/228 |
| 4,181,867 A | * | 1/1980 | Muller .................. | 310/156.34 |
| 5,216,310 A | * | 6/1993 | Taghezout .................. | 310/268 |
| 5,987,763 A | | 11/1999 | Ammann et al. | |
| 6,076,266 A | | 6/2000 | Beckingham et al. | |

FOREIGN PATENT DOCUMENTS

DE    196 15 515 C    3/1997

* cited by examiner

*Primary Examiner*—G. Bradley Bennett
*Assistant Examiner*—Tania C Courson
(74) *Attorney, Agent, or Firm*—Oliff & Berridge, PLC (57) ABSTRACT

The invention relates to a device for adjusting the angle of a sighting unit towards a target, in particular for a geodesic-measuring instrument. The inventive device comprises a reference base, at least one bearing for mounting the sighting unit thereon in such a way that it is pivotable with respect to said reference base around an axis, a gear for accurately adjusting an angle of rotation around said axis between the sighting unit and the reference base and a coupling unit for limiting or interrupting a torque flux around the axis. The gear and the coupling unit are in series arranged in the torque flux between the sighting unit and the reference base. The torque flux is carried out around the axis between the sighting unit and the reference base by means of the gear and the coupling unit when it is non-interrupted thereby. Said device is characterised in that the coupling unit is provided with at least one electromagnet for producing a magnetic field and the torque flux can be limited or interrupted according to the interruptibility of the magnetic field.

10 Claims, 5 Drawing Sheets

DEVICE FOR ADJUSTING THE ANGLE OF A SIGHTING UNIT TO A TARGET

The invention relates to a device for adjusting the angle of a sighting unit to a target, in particular for a geodetic measuring instrument.

Geodetic measuring instruments, for example theodolites, tacheometers or total stations, in which a sighting unit is aligned with a target by rotation about at least one axis, are generally distinguished by a very high angle adjustment accuracy which, depending on the accuracy class, is down to below 0.5" or 0.15 mgon. Such high accuracies require highly precise drives for exact adjustment of an angle. In addition to the high angle adjustment accuracy, however, high angle adjustment speeds are also required in order to permit fast and uncomplicated, rough angle adjustment in the range of, for example, +/−180°. Even in the case of levels and other geodetic measuring instruments of lower accuracy class, angle adjustment which is on the one hand fast and on the other hand more accurate is required, the precision of the fine angle adjustment depending on the required accuracy class. This contradictory requirement for precise fine angle adjustment on the one hand and fast angle adjustment on the other hand, which constitutes a conflict of aims, is at the root of different devices known from the prior art.

In a first known device for angle adjustment in a geodetic measuring instrument, in particular a theodolite, a tacheometer or a total station, which device is described in detail further below by figures and a more detailed description, an externally switchable, mechanically actuatable, friction coupling in the form of a clamping device is used, which coupling permits fast manual adjustment by means of direct rotation of the alhidade or of the telescope by releasing the clamping, for example a fine threaded spindle drive for finite fine adjustment of the angle within a limited range being connected in series with the clamping device. This device permits both secure fixing of the set angle by means of a sufficiently high retaining moment of up to about 1050 Nmm and an easily operated, virtually friction-free fast adjustment after release of the clamping but, on reaching the limits of the fine adjustment range, fast adjustment must first be effected again by releasing the clamping, and the fine adjustment return to the middle of its fine adjustment range before the fine adjustment of the angle can be continued.

A second device, known from the prior art and described in more detail below, for angle adjustment in, for example, a theodolite comprises a torque-switched friction clutch for rapid manual adjustment by direct rotation of the alhidade or of the telescope by overcoming a retaining moment and a mechanical, continuous precision drive connected in series to the friction clutch, for example a precision worm drive for indirect unlimited fine angle adjustment by means of a rotary knob. The retaining moment of the friction clutch cannot be changed during the normal operation by the customer but only by changing an initial spring tension by intervention in the device. Owing to the geometry of the theodolite design, uncomplicated mechanical adjustment of the initial spring tension by means of a lever which is arranged on the same part as the rotary knob, namely on the theodolite housing of the alhidade, would be problematic for kinematic reasons since the friction clutch is present on the stationary lower part of the theodolite. Owing to the constant retaining torque of the friction clutch, which is about 520 Nmm, it is therefore not possible to permit an easily operated, direct rapid adjustment, which would require a low retaining force of the friction clutch, and reliable, safe fixing of an adjusted angle, requiring a high retaining force, particularly during and after implementation of the fine adjustment, and accidental misadjustment of the angle, for example during operation of a keypad arranged on the theodolite housing of the alhidade, or by cables connected to the alhidade may therefore occur.

A third known device, likewise described in more detail below, for angle adjustment in a geodetic measuring instrument, in particular a theodolite, a tacheometer or a total station, comprises, for unlimited fine angle adjustment, an infinite, self-locking fine worm drive, the worm of which can be swivelled out of the worm wheel, with the result that the interlocking between worm and worm wheel is released and hence easily operated, manual rapid adjustment of the angle by direct rotation of the alhidade or of the telescope is possible. When the precision worm drive has been swivelled in, the set angle is fixed and can be misadjusted only by means of a rotary knob via the precision worm drive, but not by direct rotation of the alhidade or of the telescope. However, on swivelling in, the snapping of the worm into the worm wheel and the engagement of the teeth are very problematic since the tooth flanks of the worm and worm wheel may be damaged by so-called ratcheting, which results in an increase in the tolerance and hence a reduction in the accuracy of adjustment.

U.S. Pat. No. 6,076,266 describes a theodolite having an adjustment mechanism capable of being uncoupled, for alignment of a telescope with a target. Rapid adjustment can be effected by release of an externally switchable, mechanically activatable friction clutch and direct manual rotation of the telescope. When the clutch is coupled, the telescope can be precisely adjusted by means of a worm gear indirectly by manual rotation of a rotary knob connected to a worm. The worm wheel which the worm engages is arranged between two clutch discs. When the clutch is opened, the two clutch discs are a distance apart in the axial direction so that the worm wheel present in between can move freely, permitting rapid adjustment of the telescope. The clutch discs with the worm wheel present in between are in turn arranged between two yoke-mounted rollers so that the clutch discs can be moved together by reducing the distance between the two rollers rolling on the clutch discs. As a result of this, the worm wheel is clamped between the two clutch discs and the clutch is thus closed so that the fine adjustment of the telescope is permitted by rotation of the worm by means of the rotary knob. Since the yoke-mounted rollers are pressed together by means of a spring, the clutch is closed during normal operation. The movement of the rollers apart and hence the opening of the clutch for rapid adjustment are effected by partial rotation of an eccentric sleeve which is arranged between the yoke mounting of the rollers and which surrounds the worm. The eccentric sleeve leads to an adjustment lever on the rotary knob. Since the two rollers act only at a single point of the clutch discs, the two clutch discs are pressed together nonuniformly, and it is for this reason that mutual tilting of the clutch discs occurs. Thus, only a small region close to the rollers acts as an effective coupling area between the clutch discs and the worm wheel, and a relatively large pressure of the rollers is therefore required. As a result of the nonuniform pressing together of the clutch discs, different retaining moments moreover occur along the circumference, with the result that a tilting moment is still generated—particularly when the clutch is subjected to a load. Owing to the high pressure of the rollers, unhindered fine adjustment, which, in the case of said device, must take place with rolling of the rollers on the coupling discs, is not possible. The device described therefore cannot meet the high requirements for a high-precision geodetic measuring instrument. A further disadvantage of the device disclosed in U.S. Pat. No. 6,076,266 is the large space required in the radial direction. In modern total stations, the space available does not permit the use of such an adjustment mechanism as a horizontal drive. The numerous individual parts of the disclosed device, which necessitate complicated assembly and high production costs, constitute a further disadvantage.

Owing to the high rolling forces of the rollers on the clutch discs, there is furthermore the danger of furrowing. The susceptibility of the apparatus described to wear is therefore also problematic and is scarcely acceptable in the case of use in a high-precision instrument.

DE 196 15 515 C1 discloses an electrical drive device for aligning a theodolite with a target by means of at least one electric servo motor. The rough alignment of the alhidade with the target is effected here either via manual alignment of the alhidade with the target, blocking of the alhidade by the servo motor being avoided by means of a friction clutch, or via the servo motor itself, which is supplied with current until a rough required angle value specified by means of a turntable arranged below the theodolite housing of the alhidade is reached. Owing to the constant retaining moment of the friction clutch, an easily operated, mechanical rapid adjustment with simultaneous, safe and reliable fixing of the set angle is not possible. The electrical rapid adjustment requires a complicated determination of a command variable, a complex control loop for avoiding oscillation and additional space for the electric drive and the energy supply.

It is therefore an object of the invention to provide a device for adjusting the angle of a sighting unit to a target, in particular for a geodetic measuring instrument, which device permits an easily operated, uncomplicated, manual rapid adjustment of the angle by direct rotation of the sighting unit, safe, reliable fixing of the rapid adjustment mechanism and more precise, indirect adjustment of the angle, in particular with an unlimited adjustment range.

A further object of the invention is to optimize the devices of the generic type which are known from the prior art, with regard to convenience of operation, safety of operation, production costs, device size, accuracy of angle adjustment, service life and maintainability.

These objects are achieved by realizing the features of the independent claim. Features which further develop the invention in an alternative or advantageous manner are described in the dependent patent claims.

The drives according to the invention for adjusting the angle of a sighting unit to a target relative to a reference base comprises like the devices known from the prior art, at least one bearing for rotatable mounting, for example a roller bearing or sliding bearing, which permits rotation of the sighting unit relative to the reference base about at least one axis. In order to limit or to prevent the rotatable mobility of the sighting unit relative to the reference base, which is not necessarily stationary, about the axis, or to be able to adjust the angle of rotation in a specific manner, at least one gear and at least one electrically externally switchable clutch unit comprising electromagnets are arranged in series between the sighting unit and the reference base. A torque flux about the axis between the sighting unit and the reference base thus takes place substantially via the gear and the clutch unit, it being possible for rotation of the sighting unit relative to the reference base about the axis to take place via the gear and/or via the clutch unit. If the torque flux is interrupted by the clutch unit, the sighting unit can be rotated substantially without resistance by a direct moment acting on it, in particular by direct manual rotation of the sighting unit. If, on the other hand, the torque flux via the clutch unit is limited by a limiting moment, the torque acting directly on the sighting unit and applied in particular by direct manual rotation of the sighting unit must correspond at least to the limiting moment of the clutch unit to enable direct rotation to take place. In the case of a completely closed torque flux, no direct rotation of the sighting unit relative to the reference base through a moment acting directly on the sighting unit, taking into account the maximum torque transmittable by the clutch and the loadability limits of the further components present in the torque flux, can be effected.

In addition to the possibility of direct rotation of the sighting unit by means of the clutch, it is possible to produce the rotation more precisely by adjustment of the gear. Different embodiments of the gears and fine gears for adjusting an angle of rotation between a sighting unit and a reference base about an axis are known from the prior art, in particular from geodesy, especially from theodolite technology. A possible embodiment of such a gear having an unlimited adjustment range is a worm gear which is self-locking on reversal of the direction of flow of force and comprises a worm directly or indirectly rotatable by means of a rotary knob, or by means of an electric motor, and a worm wheel which is arranged about the axis of the bearings. It is of course also possible to use other gears having an unlimited adjustment range, in particular worm wheel gears or gears having a limited adjustment range, such as, for example, threaded spindle nut gears. The gear can be driven, for example, manually or by means of an electric motor, it also being possible to realize indirect drive by means of at least one second gear.

The clutch unit is electrically externally switchable and has at least one electromagnet. A torque flux via the clutch unit is limited or interrupted by the action or inaction of a magnetic field. This clutch principle is known from the prior art. For example, via the action of a magnetic field on a first ferromagnetic friction body under the opposition of a spring force, this first friction body can come into contact with a second friction body, with the result that a friction connection occurs between these two friction bodies and hence a torque can be transmitted, the maximum limiting torque transmittable thereby being related to the magnetic field strength. The magnetic field strength is in turn dependent on an electric voltage applied to an electromagnet. Thus, there is a relationship between a voltage and the maximum transmittable torque of the clutch unit. For example, by using a permanent electromagnet known from the prior art, comprising at least one permanent magnet and at least one excitation winding which reduces or neutralizes the permanent magnetic field of the permanent magnet at least in regions, in particular in the region of the ferromagnetic friction body, when a voltage is applied, it is possible to interrupt the torque flux by applying a voltage, whereas in the voltage-free state, the torque flux is closed and a torque can be transmitted up to a certain limit. Particularly in the case of mobile use of equipment which comprises said device for angle adjustment, use of such a permanent electromagnet proves to be advantageous since voltage need be available only briefly for interrupting the torque flux, i.e. for rapid adjustment of the sighting unit, and the power consumption of the device can thus be reduced. However, this may also be achieved by the use of an electromagnet which opposes a spring force. It is of course possible for the electromagnet to be in the form of an arrangement of a plurality of individual magnets. Further developments of an electrically externally switchable clutch comprising an electromagnet are known from the prior art.

The clutch unit and the gear can likewise be in the form of a common unit in which clutch and gear functional elements are formed as a common part.

By using an electrically externally switchable clutch, it is furthermore possible to mount the control unit for electrical switching of the clutch unit into an arbitrary location.

A possible application of the described device for adjusting the angle of a sighting unit to a target is the use in a geodetic measuring instrument, for example a theodolite, a tacheometer or a total station with electro-optical distance measurement, the at least one device for aligning the sighting unit with a target to be surveyed in the horizontal or vertical direction serving for horizontal measurement or measurement of the angle of elevation between a reference system and the target. The sighting unit may be, for example, in the form of a sighting telescope, a camera, a laser or a mechanical component. The use of the device in a level, a sighting system or a geodetic scanner is, inter alia, also possible. Of course, the invention is not limited to these applications.

A further advantage of the invention is the small space requirements of the device in the radial direction relative to the axis. Particularly in modern total stations, space for the horizontal drive is greatly limited in the horizontal direction. Since, when used as a horizontal drive, the clutch unit in the device according to the invention is present below the gear—and not next to the gear as in most devices known from the prior art—a spacing-saving use as a horizontal drive is possible. Since the device according to the invention is composed of relatively few, maintenance-free components, production and maintenance costs can be reduced. The fine adjustability of the sighting device is not hindered by the clutch unit since the clutch force need not be applied via high-precision parts to be adjusted. Thus, unintentional misadjustment resulting from the opening and the closing of the clutch unit can also be avoided.

The prior art and the invention are described below purely by way of example in possible embodiments with reference to figures.

FIG. 4c shows a detailed view of FIG. 4a.

Figure 1A:
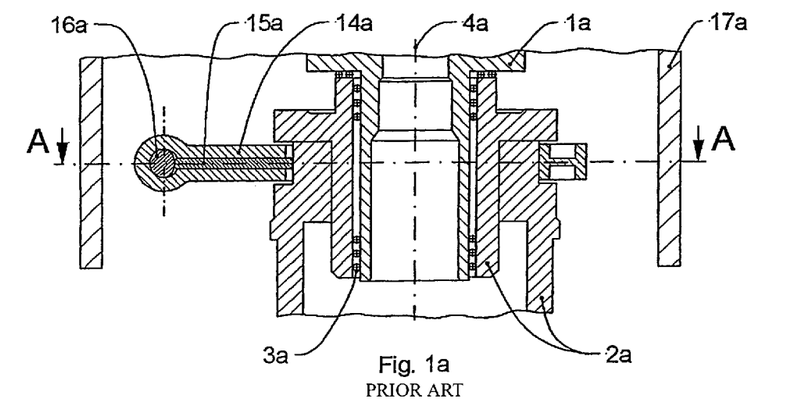
FIGS. 1a and 1b show, in two views, an embodiment of a first device known from the prior art for angle adjustment, comprising an externally switchable, mechanically actuatable friction clutch in the form of a clamping device.
Figure 1B:
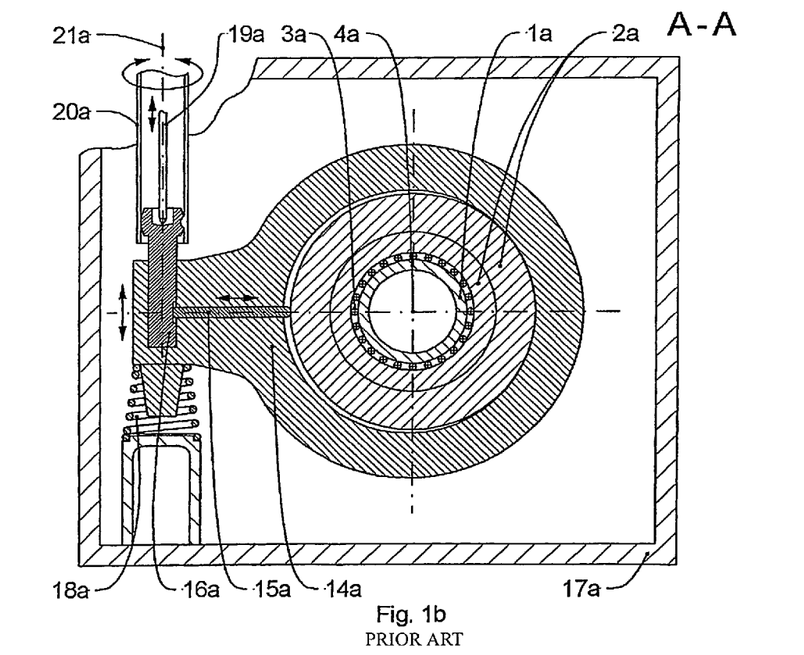

FIGS. 1a and 1b show two different cross-sections of an embodiment of a first device known from the prior art for angle adjustment, the line of the cross-section of FIG. 1b being designated by the sectional line A-A in FIG. 1a. The device used in a geodetic measuring instrument, in particular a theodolite, a tacheometer or a total station, has a sighting unit $1a$ shown only in part, in the form of an alhidade having a housing $17a$ and a reference base $2a$ which is shown in two parts and which has a theodolite substructure which is not shown. A bearing $3a$ which is in the form of a roller bearing but may also be in the form of a sliding bearing permits rotation of the sighting unit $1a$ relative to the reference base $2a$ about an axis $4a$, which is the vertical axis. A clamping ring $14a$ having a clamping pin $15a$ is arranged around the reference base $2a$. By rotating an eccentric shaft $16a$ about an adjustment axis $21a$ via a cardan-like fast-adjustment hollow shaft $20a$ which is connected to a clamping lever, which is not shown, on the housing $17a$ of the alhidade of the measuring instrument, the clamping pin $15a$ is moved along an axis intersecting the axis $4a$, with the result that the friction between the reference base $2a$ and the clamping ring $14a$ changes as a function of the angle of rotation of the eccentric shaft $16a$ and of the fast-adjustment hollow shaft $20a$. Thus, the clamping ring $14a$ acts as a clutch element which can be actuated via the fast-adjustment hollow shaft $20a$ and via which a torque flux about the axis $4a$ between the clamping ring $14$ and the reference base $2a$ can be reduced or can be interrupted, with the result that the angle of rotation of the sighting unit $1a$ relative to the reference base $2a$ about the axis $4a$ can be rapidly adjusted by direct easily operated manual rotation of the sighting unit $1a$. In the clamped state, a maximum torque of about 1050 Nmm can be transmitted without there being any slip between the clamping ring $14a$ and the reference base $2a$, so that unintentional misadjustment is prevented, whereas, when the clamping ring $14a$ is in the unclamped state, rotation can be effected substantially freely relative to the reference unit about the axis $4a$. In particular, the clamping ring $14a$ and a part of the reference base $2a$ form, together with the clamping pin $15a$, the eccentric shaft $16a$ and the fast-adjustment hollow shaft $20a$, an externally switchable, mechanically actuatable friction clutch unit. The clamping ring $14a$ is connected to the housing $17a$ via a coil spring $18a$ and a fine adjustment spindle $19a$. By adjusting the fine adjustment spindle $19a$ along the adjustment axis $21a$, the sighting unit $1a$ is rotated relative to the clamping ring $14a$ about the axis $4a$. The movement of the fine adjustment spindle $19a$ along the adjustment axis $21a$ is effected precisely by means of a precision threaded spindle drive which is not shown and can be driven by a rotary knob on the housing $17a$ of the alhidade of the measuring instrument and which thus forms a gear connected in series with the clutch unit, the clutch unit and the gear being arranged in a possible torque flux about the axis $4a$ between the housing $17a$ and thus the sighting unit $1a$ and the reference base $2a$. The coil spring $18a$ presses the clamping ring $14a$ via the eccentric shaft $16a$ against the fine adjustment spindle $19a$. Owing to the limited adjustment distance of the fine adjustment spindle $19a$ and the geometric conditions, the precise adjustment of the angle of the sighting unit $1a$ relative to the reference base $2a$ about the axis $4a$ can be effected only within certain limits. Even in the clamped state, it is possible to rotate the sighting unit $1a$ slightly relative to the reference base $2a$ against the force of the coil spring $18a$, the original angle adjustment being restored as soon as there is no longer a sufficient force acting against the coil spring $18a$.

Figure 2A:
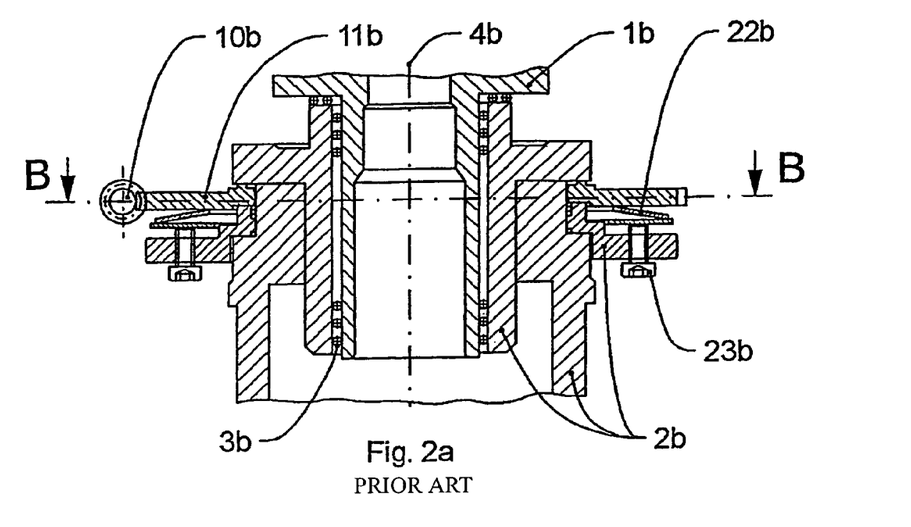
FIGS. 2a and 2b show, in two views, an embodiment of a second device known from the prior art for angle adjustment, comprising a torque-switched friction clutch.
Figure 2B:
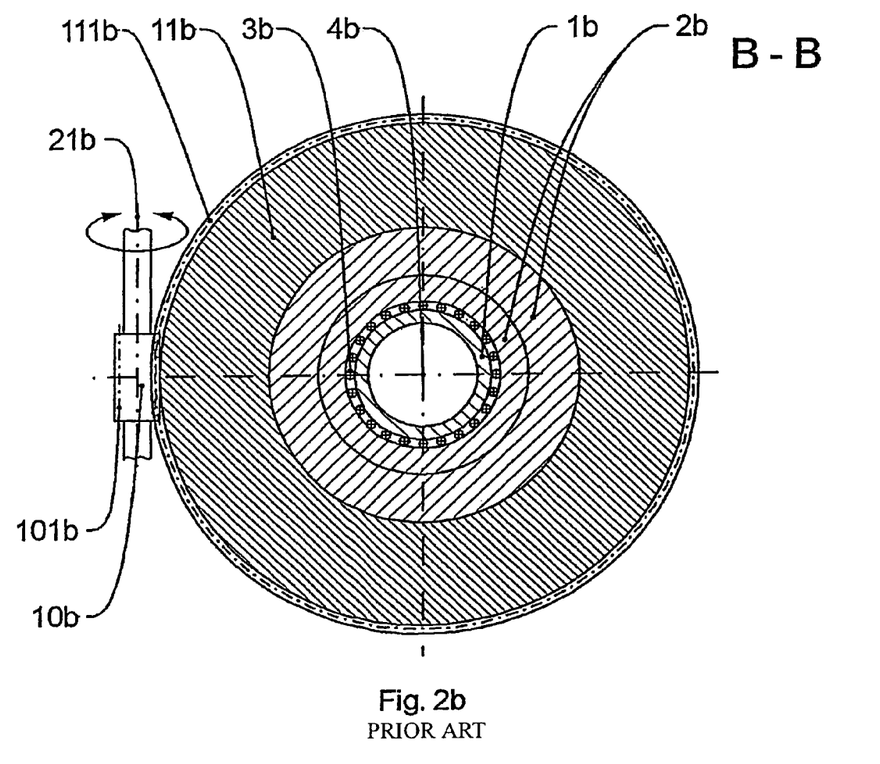

FIGS. 2a and 2b show, in the two cross-sections, an embodiment of a second device for angle adjustment which is known from the prior art. A sighting unit $1b$ in the form of an alhidade, for example a theodolite, is mounted by means of a bearing $3b$ so as to be rotatable about the axis $4b$ relative to a reference base $2b$ having a theodolite substructure which is not shown. Furthermore, a worm wheel $11b$ which is rotatable relative to the reference base $2b$ is arranged around the axis $4b$. A torque is transmitted around the axis $4b$ up to a limit determined by the setting of the pretensioning screws $23b$ by means of friction via a friction clutch spring $26b$ which is tensioned by means of pretensioning screws $23b$ between the reference base $2b$ and the worm wheel $11b$. As soon as the limiting moment is reached by a transition from static friction to sliding friction, slip occurs between the friction clutch spring 22b and the worm wheel 11b or the reference base 2b, with the result that rotation of the worm wheel 11b relative to the reference base 2b takes place. The teeth 111b of the worm wheel 11b engage the teeth 101b of a worm 10b. The worm 10b is indirectly connected to the sighting unit 1b and can be precisely rotated about the adjustment axis 21b indirectly by means of a rotary knob, which is not shown, on the theodolite housing, which is not shown. Thus, a part of the reference base 2b, the friction clutch spring 22b, the pretensioning screws 22b and a part of the worm wheel 11b form a torque-switched friction clutch unit which is connected in series to a gear which is formed in particular by the worm wheel 11b and the worm 10b, the worm wheel 11b being both an element of the clutch unit and a component of the gear. The friction clutch with the friction clutch spring 22b and the pretensioning screws 23b permits direct rapid manual adjustment of the angle of rotation of the sighting unit 1b relative to the reference base 2b about the axis 4b by overcoming a limiting moment, which is, for example, about 520 Nmm, whereas an infinite fine adjustment of the angle of rotation can be carried out via the gear comprising the worm wheel 11b and the worm 10b. The limiting moment of the friction clutch can be adjusted by adjusting the pretensioning screws 23b which are arranged on the reference base 2b. The limiting moment is chosen so that firstly accidental misadjustment, for example by actuation of controls on the sighting unit 1b, is avoided, and secondly, the sighting unit 1b can be adjusted directly without applying an excessively large force. However, an adaptation of the limiting torque cannot be carried out by the user. An easily operated rapid adjustment and safe fixing of the set angle are therefore not possible.

Figure 3A:
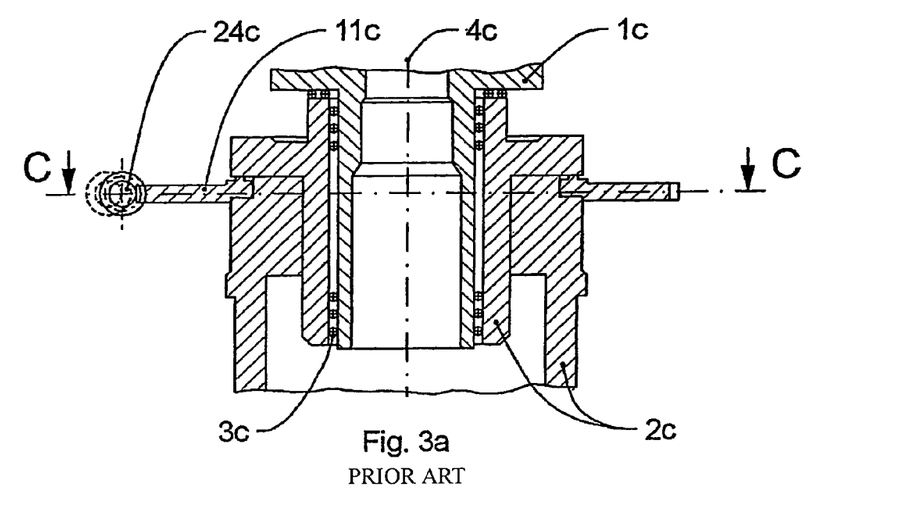
FIGS. 3a and 3b show, in two views, an embodiment of a third device known from the prior art for angle adjustment, comprising a worm which can be swivelled out of a worm wheel.
Figure 3B:
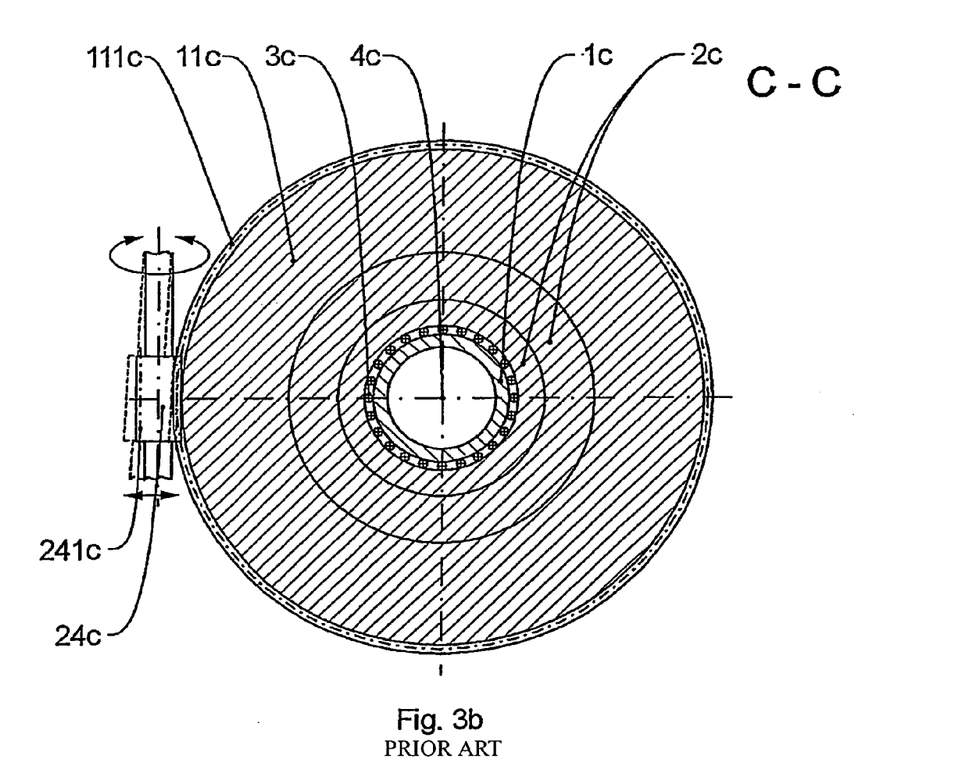

FIGS. 3a and 3b show, in the two cross-sections, an embodiment of a third device for angle adjustment in a geodetic measuring instrument, in particular a theodolite, a tacheometer or a total station, which device is known from the prior art. As in the case of the embodiment of FIGS. 2a and 2b, the device has a worm wheel 11c which is arranged around the axis 4c. Here, however, the worm wheel 11c is firmly connected to the reference base 2c. The teeth 111c of the worm wheel 11c engage the teeth 241c of a worm 24c. By precise rotation of the worm 24c connected indirectly to the housing of the measuring instrument, which housing is not shown, and hence to the sighting unit 1c, the angle of rotation of the sighting unit 1c mounted in the bearing 3c can be precisely adjusted about the axis 4c relative to the reference base 2c. The worm 24c is in the form of a pivotable worm which can be swivelled out of the engagement region of the teeth 111c of the worm wheel. As soon as the pivoting worm teeth 241c and the worm wheel teeth 111c are no longer engaged, the angle of rotation of the sighting unit 1c relative to the reference base 2c about the axis 4c can be rapidly adjusted by direct easily operated manual operation of the sighting unit 1c. It is evident that the engagement of the tooth systems is problematic. In particular, the tooth flanks of the pivoting worm teeth 241c and of the worm wheel teeth 11c may be damaged by ratcheting.

Figure 4A:
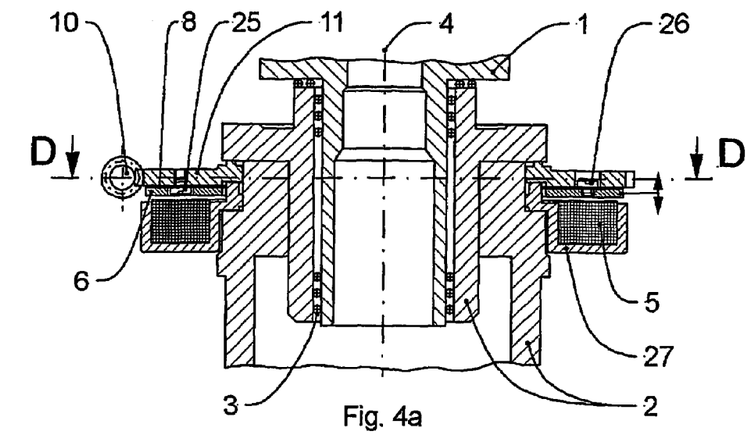
FIGS. 4a and 4b show, in two views, a possible embodiment of a device according to the invention for angle adjustment, comprising an electrically externally switchable clutch unit having an electromagnet.
Figure 4B:
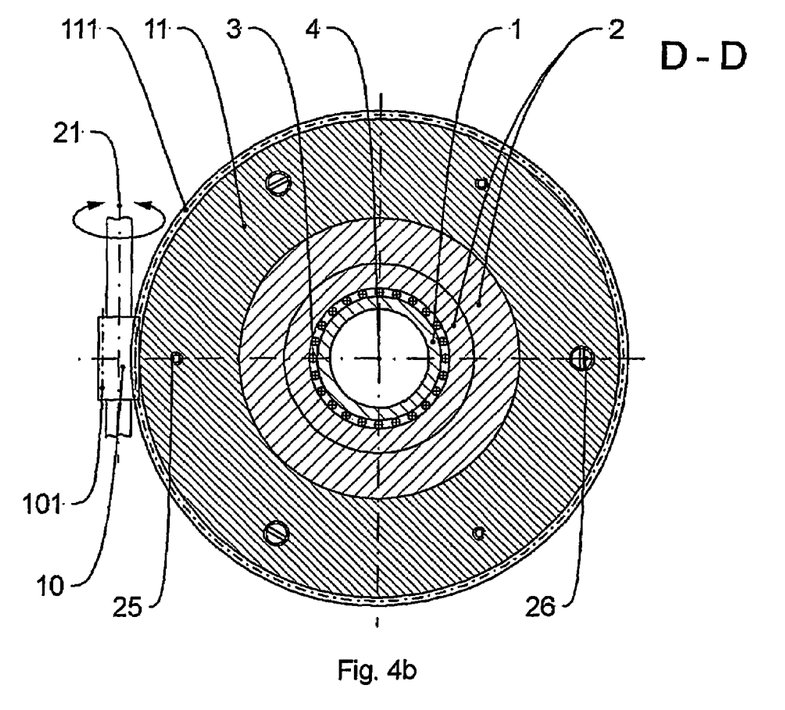
Figure 4C:
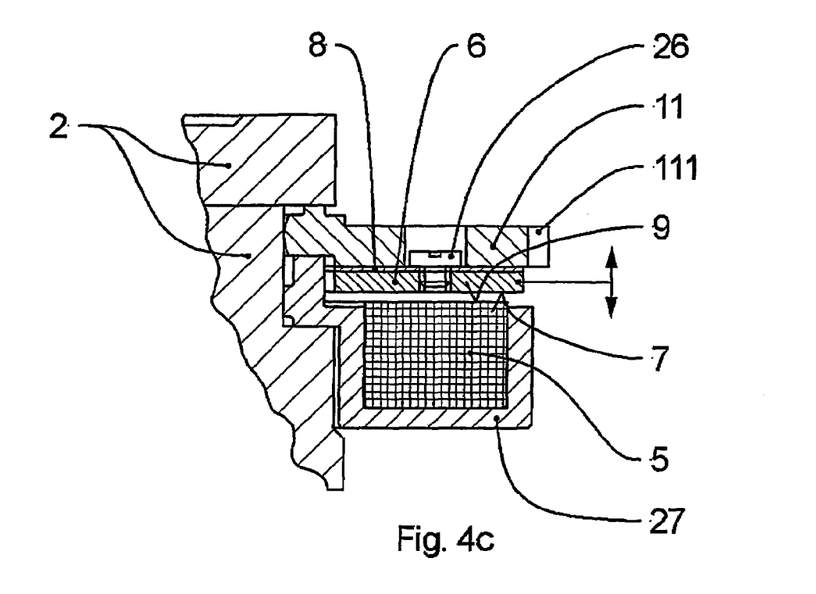

FIGS. 4a and 4b show a possible embodiment of a device according to the invention for angle adjustment. FIG. 4c shows a detail of FIG. 4a on a larger scale. A sighting unit 1 is mounted by means of a bearing 3, which is in the form of a play-free roller bearing but may also be in the form of a sliding bearing, so as to be rotatable about an axis 4 relative to a reference base 2, which is shown as consisting of two parts. A magnet support 27 which consists, for example, of an aluminium alloy, with an electromagnet 5 which surrounds the axis 4, is firmly arranged on the reference base 2. A worm wheel 11 which is rotatable relative to the reference base 2 likewise surrounds the axis 4 and the reference base 2 above the electromagnet 5. Three screws 25 which are present on a circle around the axis 4 at spacings of 120° and are referred to below as worm wheel screws 25 connect a spring element 8, which is in the form of a thin flat disc of spring steel or in the form of a spring membrane, to the worm wheel 11. The spring element 8 is connected to a flat ferromagnetic brake disc 6 by means of three further screws 26, which are referred to below as brake disc screws 26, which are likewise arranged on the circle at spacings of 120° but are offset by 60° on the circle relative to the worm wheel screws 25. The brake disc 6 consists, for example, of 9 SMnPB 30. As a result of the special arrangement of worm wheel 11, spring element 8, brake disc 6, worm wheel screws 25 and brake disc screws 26, the brake disc 6 can move relative to the worm wheel 11 along the axis 4 in such a way that it can spring back. In the normal state, worm wheel 11, spring element 8 and brake disc 6 are present directly one on top of the other. As soon as a force caused by a magnetic field of the electromagnet 5 acts on the brake disc 6 along the axis 4 in the direction of the electromagnet 5, the spring element 8 which is flat in the starting state is elastically deformed and, owing to the arrangement of the screws (25, 26) assumes a wave shape along the circle. Against the action of this spring force, the brake disc 6 therefore moves in the direction of the electromagnet 5 until, with sufficient magnetic force, the electromagnet surface 9 and the brake disc surface 7, both of which are opposite one another, come uniformly into contact and thus act as friction surfaces along the entire circumference. Since the electromagnet 5 is connected to the reference base 2 via the magnet support 27, a torque can thus be transmitted between the worm wheel 11 and the reference base 2 by the action of a magnetic field which is related to a voltage applied to the electromagnet 5. When a magnetic force no longer acts on the brake disc 5, the spring element 8 assumes a flat state again, with the result that the brake disc 5 moves back into the starting position and there is no longer any contact between the brake disc surface 7 and the electromagnet surface 9. In particular, the electromagnet 5 with its electromagnet surface 9 and the brake disc 6 with its brake disc surface 7, together with the spring element 8, the screws 25, 26 and a part of the worm wheel 11, thus form an electrically externally switchable clutch unit, by means of which, depending on a voltage, a torque flux can be substantially interrupted or a maximum transmittable torque can be varied. The worm wheel has worm wheel teeth 111 which engage the worm teeth 101 of a worm 10. The worm 10 is mounted so as to be rotatable about an adjustment axis 21 and is indirectly connected to the sighting unit 1. Thus, if the torque flux is not interrupted by the clutch unit, an angle of rotation between the sighting unit 1 and the reference base 2 about the axis 4 can be more precisely adjusted by rotation of the worm 10 about the adjustment axis 21, while, when the torque flux is interrupted, direct rapid manual adjustment of the angle of rotation is possible by direct rotation of the sighting unit 1. The worm wheel 11 with its worm wheel teeth 111 forms, together with the worm 10 and its worm teeth 101, a gear which is connected in series with the clutch unit, the gear and the clutch unit being arranged in a possible torque flux about the axis 4 between the sighting unit 1 and the reference base 2. Of course, a further gear for driving may be connected upstream of the worm 10. The worm wheel 11 is firstly an element of the clutch unit and secondly a component of the gear. The embodiment shown can be realized either by an electromagnet in which a magnetic field acts on the brake disc 6 when a voltage is applied or by a permanent electromagnet, the magnetic field of which on the one hand acts on the brake disc 6 in the voltage-free state by means of a permanent magnet and, on the other hand, is reduced on application of a voltage to at least one excitation winding in the region of the brake disc 6. In an alternative embodiment, the worm wheel screws 25 and the brake disc screws 26 are dispensed with. Instead, the fixing takes place by means of spot welds or spot adhesive bonds.

Figure 5:
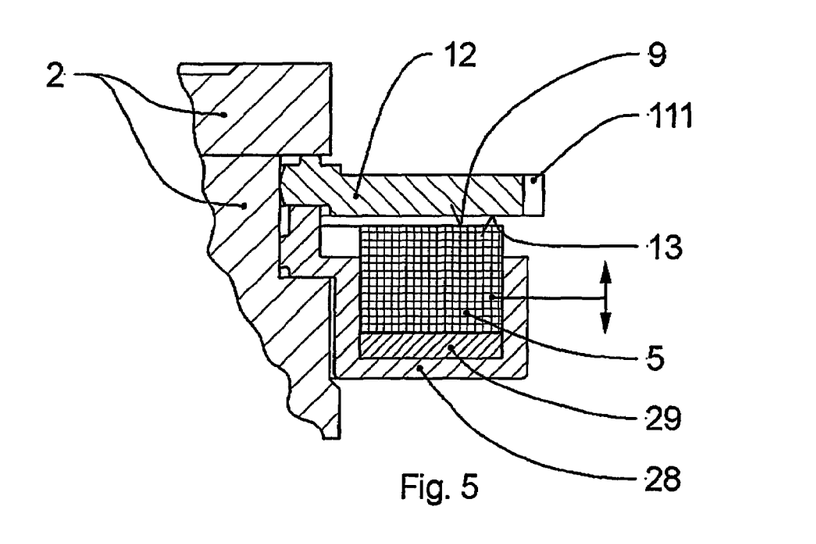
FIG. 5 shows, in a detailed view, a further possible embodiment of the device according to the invention for angle adjustment.

A further embodiment of the device according to the invention for angle adjustment, a variant of the embodiment shown in FIGS. 4*a*, 4*b* and 4*c*, is shown in a detailed view in FIG. 5. Here, instead of a movable brake disc 6 having a spring element 8, an electromagnet 5 which can be moved along the axis 4 and is mounted in a magnet support 28 by means of a magnet support spring element 29 is used in the clutch unit. The magnetic field of the electromagnet 5 acts directly on a ferromagnetic worm wheel 12, with the result that the electromagnet 5 moves in the direction of the ferromagnetic worm wheel 12 against the action of the magnet support spring element 29 until, with a sufficient magnetic force, the electromagnet surface 9 and the worm wheel surface 13, both of which are opposite one another, come uniformly into contact and thus act as friction surfaces. It is also possible to omit the magnet support spring element 29 and to mount the guided electromagnet in the magnet support 28 so as to be movable in the direction of the axis 4, with the result that gravitational force brings the electromagnet 5 back to the starting position when no magnetic field is acting. The remaining structure of the variant shown in FIG. 5 and the mode of operation correspond to the embodiment of FIGS. 4*a*, 4*b* and 4*c*.

The invention claimed is:

1. Device for adjusting the angle of a sighting unit to a target, in particular for a geodetic measuring instrument, comprising
   a sighting unit, which is rotatable about an axis,
   a reference base,
   at least one bearing for mounting the sighting unit to be rotatable relative to the reference base about an axis,
   a gear for adjusting an angle of rotation between the sighting unit and the reference base about the axis, and
   a clutch unit by which a torque flux about the axis can be at least one of limited or interrupted,
   the gear and the clutch unit being connected in series between the sighting unit and the reference base, and
   the torque flux around the axis between the sighting unit and the reference base occurring via the gear and the clutch unit, unless the torque flux is interrupted by the clutch unit,
   wherein the clutch unit has at least one electromagnet arranged around the axis for generating a magnetic field, and
   the torque flux around the axis can be at least one of limited interrupted by the action of the magnetic field.

2. Device according to claim 1, wherein the electromagnet is in the form of a permanent electromagnet comprising at least one permanent magnet and at least one excitation winding, the excitation winding at least one of reducing or neutralizing a permanent magnetic field of the permanent magnet when a voltage is applied.

3. Device according to claim 1, wherein the electromagnet is substantially annular.

4. Device according to claim 1, wherein the electromagnet is in the form of at least two individual electromagnets which are arranged substantially in a circle, the midpoint of the circle lying on the axis, the axis passing perpendicularly through the circular area defined by the circle.

5. Device according to claim 1, wherein the clutch unit has at least two parts forming friction surfaces, the two parts being disc-like parts arranged around the axis, for torque transmission by friction which can be caused by pressing against one another.

6. Device according to claim 5, wherein the clutch unit comprises
   a ferromagnetic brake disc which surrounds the axis and on which the magnetic field can act, having a brake disc surface, and
   a disc-like, flat-spring element which is connected firstly to the gear and secondly to the brake disc,
   and the parts forming friction surfaces are at least in the form of
   the ferromagnetic brake disc having the brake disc surface, and
   the electromagnet having an electromagnet surface,
   the brake disc, as a result of the action of the magnetic field, being movable against the action of a spring force of the spring element, in the direction of the electromagnet until the brake disc surface presses against the electromagnet surface.

7. Device according to claim 6, wherein
   the gear comprises a worm and a worm wheel, a midpoint of the worm wheel lying on the axis, and
   the brake disc of the clutch unit is directly connected to the worm wheel of the gear via the spring element of the clutch unit.

8. Device according to claim 5, wherein at least one of the parts of the coupling unit which form friction surfaces and a toothed wheel part of the gear are formed as a common part.

9. Device according to claim 8, wherein the gear comprises a worm and a ferromagnetic worm wheel, a midpoint of the ferromagnetic worm wheel lying on the axis, having a worm wheel surface, the magnetic field acting on the ferromagnetic worm wheel,
   the common part of the clutch unit and of the gear is formed by the ferromagnetic worm wheel, and
   the parts forming friction surfaces are at least in the form of the ferromagnetic worm wheel having the worm wheel surface and in the form of the electromagnet having an electromagnet surface,
   the electromagnet, as a result of the action of the magnetic field and against the action of a spring force caused by a spring element, being movable in the direction of the ferromagnetic worm wheel until the electromagnet surface and the worm wheel surface press against one another.

10. Device according to claim 1, wherein the gear for adjusting the angle of rotation has an unlimited adjustment range.

\* \* \* \* \*

UNITED STATES PATENT AND TRADEMARK OFFICE
CERTIFICATE OF CORRECTION

PATENT NO.        : 7,412,770 B2                                    Page 1 of 1
APPLICATION NO. : 10/554459
DATED             : August 19, 2008
INVENTOR(S)       : Anton Hale It is certified that error appears in the above-identified patent and that said Letters Patent is hereby corrected as shown below:

<u>Column 9</u>
      Lines 52-53, replace "the torque flux around the axis can be at least one of limited interrupted by the action of the magnetic field."

with:

--the torque flux around the axis can be at least one of limited or interrupted by the action of the magnetic field.--

Signed and Sealed this

Twenty-eighth Day of October, 2008

JON W. DUDAS
*Director of the United States Patent and Trademark Office*